Jan. 24, 1956  L. H. DORNBERG  2,732,238
LATCH
Filed July 11, 1952  2 Sheets-Sheet 1

INVENTOR.
LAWRENCE H. DORNBERG
BY *Roy Mattern Jr.*
ATTORNEY

Jan. 24, 1956  L. H. DORNBERG  2,732,238
LATCH
Filed July 11, 1952  2 Sheets-Sheet 2
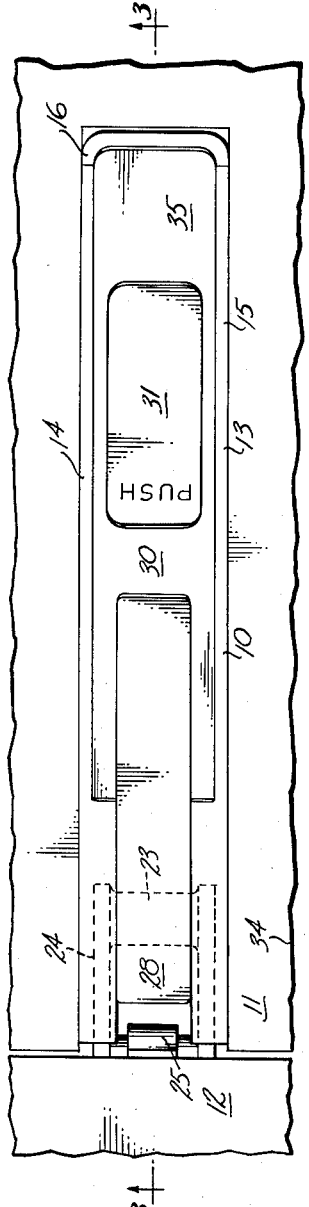
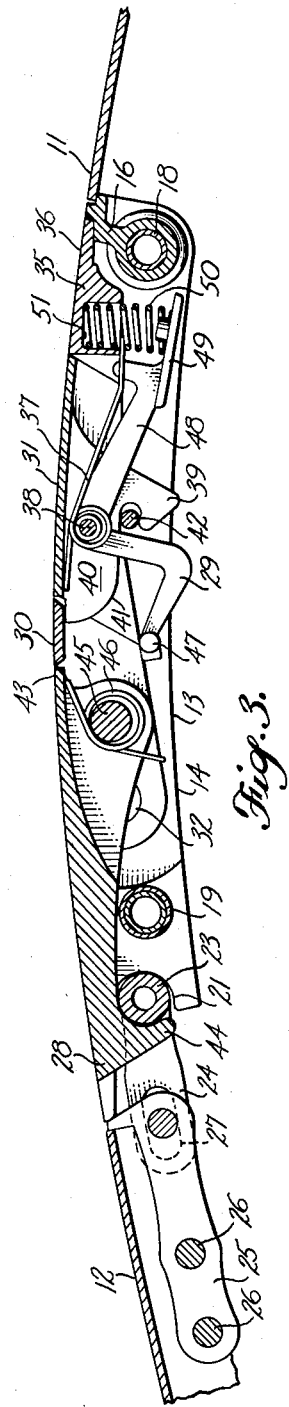
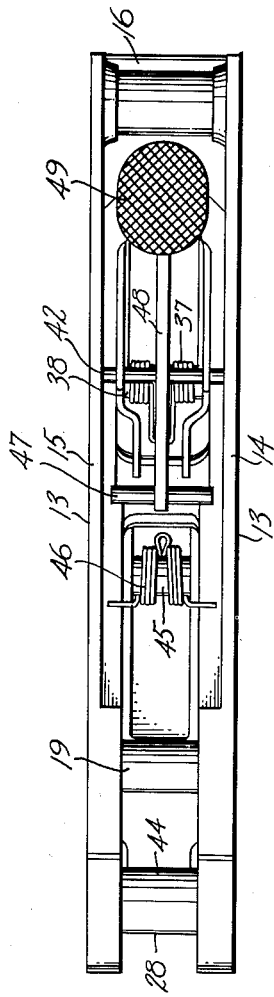
INVENTOR.
LAWRENCE H. DORNBERG
BY *Roy Mattern Jr.*
ATTORNEY

United States Patent Office 2,732,238
Patented Jan. 24, 1956

2,732,238

LATCH

Lawrence H. Dornberg, Seattle, Wash., assignor to Boeing Airplane Company, Seattle, Wash., a corporation of Delaware Application July 11, 1952, Serial No. 298,253

4 Claims. (Cl. 292—113)

The invention relates to latches and more particularly to latches installed in airframes for securing cowlings and the like.

The invention comprises a housing completely installed within a structural member and containing the entire movable mechanism operable with one hand for hooking and locking two structural members together, and a hook anchoring means consisting of a pin integral with a variably positioned yoke, and a yoke support secured to the other structural member.

The purpose of the invention is to provide a compact lightweight strong latch easily operated upon release or closing, with the operator using only one hand.

It is an object of the invention to provide a latch having all the moving parts in one interchangeable assembly.

It is an object of the invention to provide a latch necessitating only a single cutout which is confined to the skin of one of the abutting members.

It is an object of the invention to provide a latch that is installed in a compact space limited in depth below the surface of the abutting members.

It is an object of the invention to provide a latch which draws together abutting sections that substantially move together along the same arcuate path.

It is an object of the invention to provide a latch that prevents transverse movement normal to the external skin surface of the abutting members.

It is an object of the invention to provide a latch that permits limited relative movement between abutting members along the butt joint in the plane of their skin surfaces to allow for minor misalignments.

It is an object of the invention to provide a latch with a handle catch which upon its release is guided by its integral cam thereby raising the handle and upon its closure locking itself and also locking the handle.

It is an object of the invention to provide a latch with a hook catch which holds the hook in a raised position when the hook is released.

The purpose and objects of the invention will become more apparent as the following description is read with reference to the drawings wherein the same part is identified by a like numeral throughout the views. In the drawings:

Figure 2 is a top view of the movable components of the latch mounted in the latch housing.

Figure 3 is a sectional view of Figure 2 on line 3—3, and

Figure 4 is a bottom view of the movable components of the latch mounted in the latch housing.

Figure 1:
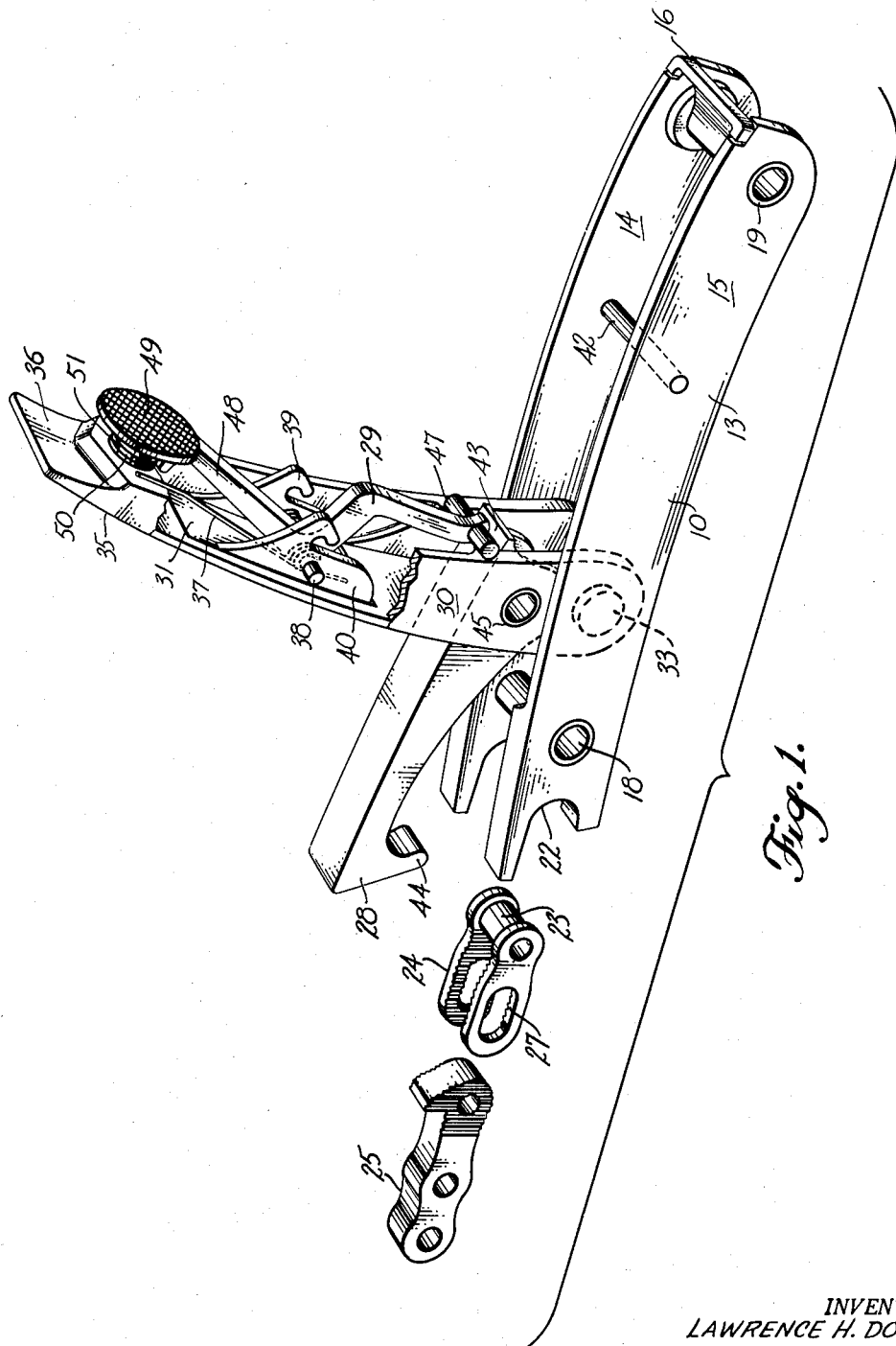
Figure 1 is a perspective view of the components of the latch before installation with the hook and handle in their released positions.

More particularly the invention concerns the design of a latch 10 for joining together two abutting structural members 11 and 12 at a specific location serving in conjunction with other similar latches (not shown) as a convenient and safe means for drawing together the members 11 and 12 and securing them in their installed position.

The movable gripping mechanism of the latch is entirely contained within the abutting structural member 11. The non-movable anchoring device is held in place in the other abutting structural member 12.

In the member 11, the housing 13 is firmly mounted as a support for the movable gripping mechanism. The housing 13 is an assembled unit composed of two sides 14 and 15 of rectangular cross section and spaced apart by an interfitting end piece 16. These respective parts of the housing 13 are held together by flared end hollow pins 18 and 19, one passing through the sides 14 and 15 and the end piece 16, and the other located nearer the open end 20 of the housing 13 passing through the sides 14 and 15. Bolts (not shown) are passed through the hollow pins 18 and 19 to secure the housing 13 to the structure 11.

At the open end 20, each side 14 and 15 of the housing 13 is cut away to form the respective open slots 21 and 22. When the latch is closed, these slots 21 and 22 receive the anchoring pin 23 and other portions described later that are attached to the adjoining structural member 12. The slots 21 and 22 serve as guides facilitating the alignment of the abutting structural members 11 and 12 and preventing their subsequent transverse movement in a direction normal to their exterior surfaces.

The anchoring pin 23 is an integral portion of the yoke 24 which is complementary and adjustably fitted to a yoke support 25. The support 25 in turn is retained in the member 12 by the bolts 26, 26.

There are complementary serrated surfaces on the yoke 24 and yoke support 25 and a slotted hole 27 in the yoke 24. This construction facilitates adjustments varying the location of the anchoring pin 23 relative to the gripping mechanism contained with the housing 13.

The movable gripping mechanism is a cooperating arrangement of a hook 28, hook catch 29, handle 30 and a handle catch 31 interconnected with the handle 30. The handle 30 is pivotally mounted in the housing 13 on oppositely disposed circular projections 32, 33 integral with each respective side 14 and 15 of the housing 13 at a point removed from its open end by a distance approximating one third of its length. The rotatable handle 30 upon closing the latch rotates on the projections 32 and 33 fitting into the housing 13 flush with the housing and the skin 34 of the structural member 11. The handle 30 has a channel shaped cross section and its top surface is partially cut away to accommodate a pivot catch 31. The swinging end has a formed solid portion 35 serving as a finger grip 36.

The pivotal catch 31 is pin mounted in the handle 30. A spring 37 surrounds its mounting pin 38 and the spring ends are anchored so the spring maintains the top of the catch 31 within the cut away portion and flush with the top surface of the handle 30.

Integral with and extending below the top of the catch 31 are spaced hooking members 39, 39 the extending portions of which also serve as the bearing mountings 40, 40 for the mounting pin 38 and as cams 41, 41 utilized in raising the catch-handle unit. As the catch is closed with the handle in a flush relationship the hooks grip an anchoring pin 42 which is fastened between the sides 14 and 15 of the housing 13.

The hook 28 is pivotally retained at its end 43 opposite the hooked end 44 by the pin 45 secured between the flanges of the handle 30. The pin 45 is spaced from the projections 32, 33 that secure the handle 30 to the housing 13. A coil spring 46 is placed around the pin 45 and anchored against both the handle 30 and the hook 28. This spring biased pin mounting of the hook 28 results in movement of the hooked end 44 as affected by both the rotation of the hook 28 about its pin 45 and the handle 30 around its projections 32, 33 carrying the pin 45.

When the latch is closed the hooked end 44 supplements the formed ends of the sides 14 and 15 of the housing 13 to encompass the anchoring pin 23. Minor misalignment along the butt joint is possible without hindering the closure of the latch 10. The yoke 24 is made with adequate clearance to receive the hooked end 44 of the gripping hook 28, and the overall width of the yoke 24 is limited relative to the overall width of the housing 13 as shown in Figure 2.

To facilitate the positioning of the hook 28 through the operating motion of the handle 30 a hook catch 29 is mounted at its approximate center at the midpoint of the pin 38 which as noted previously also serves as the mounting for the handle catch 31. The hook catch 29 has an extending leg 47 which rides up and over the end 43 of the hook 28 as the handle 30 is raised during the unlatching motion. It has another oppositely extending leg 48 terminating in a finger pad 49. The pad 49 is biased away from the handle 30 by a spring 50 partially confined within a recess 51 in the formed solid portion 35 of the handle 30. When the finger pad 49 is moved toward the handle portion 35 compressing the spring 50 the contacting leg 47 is moved clear of the hook end 43 freeing the hook 28.

This construction of the hook catch 29 increases the control of the hook 28 through movement of the handle 30.

The sequence of motions that combine to provide a convenient complete latching cycle from the closed to the open position and back to the closed again, is described as follows:

From the closed position of Figures 2, 3 and 4 the latch is opened as shown in Figure 1 with the operator using just one hand. A force is applied by pushing down on the top of handle catch 31 at the location noted in Figure 2 by the word "Push." This pivots the handle catch 31 about the pin 38 so the catch hooks 39, 39 clear the anchoring pin 42 and the cams 41, 41 bearing against the pin 42 tend to pivot the entire handle 30 about its mounting projections 32 and 33.

The handle 30 itself then may be gripped at its finger grip 36 and rotated until the hook 28 is cleared from the anchoring pin 23 in the adjacent structure 12, the added clearance resulting in part from the spaced relationship of the pivot points of the handle 30 and the hook 28, as noted previously.

During this handle rotation the contact leg 47 of the hook catch 29 moves up and over the hook end 43 biased by its own spring 50. This positions the hook 28 relative to the handle 30 overcoming the force of its own spring 46 that normally maintains the hooked end 44 in contact with the anchoring pin 23. With the hook 28 restrained in this manner, further clearance between the hook 28 and the anchoring pin 23 is subsequently acquired by reversing the rotation of the handle 30.

When all latches 10 are in this position where the hook 28 is clear as noted in Figure 1 the structural members 11 and 12 may be separated as the gripping and gripped portions of the latch 10 are positively disengaged.

The closing of the latch 10 is likewise accomplished with ease with the operator using just one hand. The handle 30 is again moved in the opening direction placing the hook 28 over the pin 23. The application of pressure to the pad 49 pivots the hook catch contact leg 47 thereby releasing the hook 28 so its spring 46 is again effective to keep the hooked end 44 in contact with the pin 23. Then the handle 30 is closed tightening the hook 28 about the pin 23 as the hook pin 35 rotates about the handle pin 24, thereby drawing together the structures 11 and 12.

The handle catch 31 moves into its locking position as the handle 30 is closed. The lower portions of the catch-hooks 39, 39 cam over the pin 42 and into the locked position as the spring 37 pivots the entire catch 31 into the handle 30 and the housing 13 so that in the secured position of the latch 10, all its component parts are flush with the outer surface of the skin 34.

Having now particularly described and ascertained the nature of my invention and in what manner the same is to be performed, I declare that what I claim is:

1. In a latch for joining together two edge abutting members drawing them toward one another along the same arcuate path by the operator's single handed operation of mechanism installed in but one of the members, a pin grasping assembly comprising a housing having a pin receiving-aligning end, a central receiving space, a means for attachment to one of the abutting members, and means for supporting the remainder of the pin grasping assembly within the central receiving space; and operating mechanism of the pin grasping assembly comprising, a pivoting handle mounted on the housing spaced from the pin receiving end having a finger grip on its swinging end and means for mounting other components of the pin grasping mechanism, a hook pivot pin secured to the said handle at a location spaced from the handle pivot, a hook pivotally mounted on the hook pivot pin, a spring around the hook pivot pin biasing the hook into the housing, a hook catch pivotally attached to the handle having a cam on its end to overrun the restricted hook end and thereafter retaining the hook in a fixed relationship with the handle and having the other end equipped with a finger pad, and a spring to force the finger pad away from the finger grip thereby holding the hook until a releasing force is applied to the finger pad, a handle catch-hook receiving means on the housing and a handle catch pivotally carried by the handle having hooks to engage the handle catch-hook receiving means, cams to guide the hooks into place, a spring to hold the hooks in place, finger pressure pads on its top surface to receive the pivoting force necessary to clear the catch-hook portions from the handle catch-hook receiving means against the spring action and additional cams to ride over the housing catch-hook receiving means upon opening the latch thereby causing the attached handle to rise clear of the housing for conveniently gripping the handle in continuing the unlatching operation whereby the handle motion clears the hook from an anchoring means in the other one of the abutting members and subsequently the hook is further removed upon the reverse rotation of the handle as the hook catch bears against the pivot end of the hook.

2. In a one-hand operative latch for conveniently aligning and holding together two abutting members, a handle controlled hook assembly comprising a housing attachable to one member of the two members to be joined together and serving as a mounting, aligning and anchoring means including projections for supporting a handle, recessed side-end portions to partially encompass another member of two members to be joined together and a catch anchoring pin; a handle pivotally connected to the housing near the recessed side-end portions and completely insertable into the housing in a flush relationship including a finger grip at its swinging end, a spring held handle catch for holding the handle in the latched position, the handle catch having integral cams for guiding the closing of the catch about the catch anchoring pin and for raising the handle as the handle catch is rotatably released, a pin mounting for a hook near the pivot of the handle, a centrally pivotally mounted spring-held hook catch with an attached finger pad at one end and a hook-end contacting cam at its other end; a hook pivotally mounted on the handle insertable in the handle and housing in a flush relationship with a cam on its swinging hook end to guide it into engagement with the other member of the two members to be joined together and with a contact surface on its other end beyond the pivot center to receive the overriding hook catch end which upon overriding the hook end during unlatching enables the hook catch to position the hook in a set position relative to the handle so that upon subsequent reverse motion of the handle the hook is lifted clear until the latch is closed whereupon pivoting of the hook catch releases the hook for its spring urged engagement which engagement is further enhanced as the handle rotates creating the toggle action derived from the spaced pivots of the respective handle and hook mountings and which engagement is made certain upon closure of the latch as the handle catch locks the handle and accordingly the hook in their flush, closed positions.

3. A latch hook operating mechanism controllable with one hand of an operator for installation in a structure of minimum depth at a specific location near an edge of the structure comprising a housing mountable on the structure with its major axis perpendicular to an edge of the structure and designed to partially encompass a suitable hook securing means in an adjacent structure, a handle interfitted with and pivotally retained in the housing, a handle catch pivotally mounted on the handle and actuated by a spring to grasp an integral portion of the housing retaining the handle in its closed position, a hook pivotally mounted within the housing and handle at a location spaced from the handle pivot point, a spring around the hook mounting means to restrict the hook to its closed position; a hook catch mounted on the handle for spring actuated pivotal engagement with the hook holding the hook in a definite position relative to the handle until the hook catch is released by the operator.

4. A latch hook operating mechanism assembly controllable by one continuous hand motion of an operator for installation in a structure of minimum depth comprising a housing frame attachable to a structure with its major axis perpendicular to an edge of the structure, consisting of two, flat, vertical, spaced, longitudinal sides interconnected near their ends; a handle pivotally connected to the housing near the edge of the housing frame nearest the edge of a structure, completely insertable into the housing in a flush relationship; a spring held handle catch pivotally attached to the handle; an anchoring pin secured to the housing to receive the handle catch, cams integral with the handle catch for guiding and closing the catch about the anchoring pin and for raising the handle as the handle catch is rotatably released; a spring held latch hook pivotally mounted on the handle near the pivot of the handle but spaced therefrom and insertable within both the handle and housing in a flush relationship; a spring held hook catch pivotally attached to the handle to override the mounted end of the latch hook as the handle is pivoted clear of the housing frame, so that upon the reverse motion of the handle, the hook is rotated clear of the structure.

References Cited in the file of this patent

UNITED STATES PATENTS

| 2,424,962 | Best | Aug. 5, 1947 |

FOREIGN PATENTS

| 676,005 | Germany | May 24, 1939 |
| 981,093 | France | Jan. 10, 1951 |

OTHER REFERENCES

Automotive and Aviation Industries, May 1, 1944, page 28.